A. NOËL.
STUD FOR TIRE COVERS.
APPLICATION FILED JUNE 22, 1908.

992,239.

Patented May 16, 1911.

UNITED STATES PATENT OFFICE.

ANDRÉ NOËL, OF PARIS, FRANCE.

STUD FOR TIRE-COVERS.

992,239.

Specification of Letters Patent.

Patented May 16, 1911.

Application filed June 22, 1908. Serial No. 439,760.

*To all whom it may concern:*

Be it known that I, ANDRÉ NOËL, citizen of the French Republic, residing at Paris, France, have invented certain new and useful Improvements in Studs for Tire-Covers, of which the following is a specification.

This invention relates to studs or projections of hard material intended to replace the usual rivets of non-skidding tire covers, the said studs being constituted by a block having substantially the form of a truncated cone and made of tempered steel, glass, corundum or other suitable material, laid flat with its large base adjacent the outer tread of the tire, and held in place by means of a cap or crown which surrounds it and retains it, said cap having claws or tongues by which it is itself secured to the cover of the tire. The chief advantages of these studs over the constructions at present in use, are that it is possible to make them of any desired hard material and that they do not escape from the surface of the tire when they are worn out, or even when they break.

The accompanying drawing illustrates by way of example a construction according to this invention.

Figure 1:
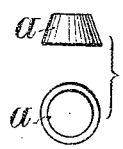
Figure 2:
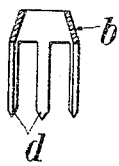
Figure 3:
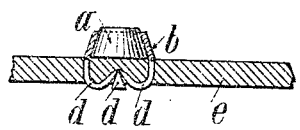

Figure 1 shows an elevation and in plan a block separately. Fig. 2 is a section through the axis of a fixing cap. Fig. 3 shows a stud secured to the cover.

In Fig. 3 it will be seen that the block $a$ has the shape of a truncated cone and is held in place by the body $b$ of the cap of the same shape, and that its claws $d$, flattened under the cover or the rubber $e$ of the casing, secure the said cap to the said cover. If the block breaks, its pieces will be held on the cover owing to the shape of the cap. The normal wear taking place simultaneously on the block and on the cap, the base with which the block rests on the cover will be always larger than the outer face, so that the block will never be liable to escape.

What I claim as my invention and desire to secure by Letters Patent is:—

In combination with a tire cover, a truncated conical block $a$ of hard material, a truncated conical cap $b$ open at both ends and adapted closely to surround said block when the latter is introduced through the open base of said cap and claws $d$ upon the bottom outer circumference of said cap for securing said block with its base in contact with said cover, said cap operating merely as a fastener.

In testimony whereof I have signed my name to this specification in the presence of two subscribing witnesses.

ANDRÉ NOËL.

Witnesses:
 H. C. COXE,
 GEORGES BONNCUIL.